(12) United States Patent
Robin et al.

(10) Patent No.: US 10,181,612 B2
(45) Date of Patent: Jan. 15, 2019

(54) DETERMINATION OF A SPATIAL DISTRIBUTION OF THE CATALYTIC ACTIVITY OF AN ELECTROCHEMICAL-CELL ELECTRODE

(71) Applicant: Commissariat A L'Energie Atomique et aux Energies Alternatives, Paris (FR)

(72) Inventors: Christophe Robin, Grenoble (FR); Remi Vincent, Grenoble (FR); Mathias Gerard, Grenoble (FR); Lara Jabbour, Turin (IT)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 133 days.

(21) Appl. No.: 15/271,606

(22) Filed: Sep. 21, 2016

(65) Prior Publication Data

US 2017/0098839 A1    Apr. 6, 2017

(30) Foreign Application Priority Data

Sep. 21, 2015   (FR) ..................................... 15 58898

(51) Int. Cl.
*H01M 8/00*   (2016.01)
*H01M 8/0432*   (2016.01)
(Continued)

(52) U.S. Cl.
CPC ......... *H01M 8/04365* (2013.01); *C25B 11/02* (2013.01); *C25B 15/02* (2013.01);
(Continued)

(58) Field of Classification Search
CPC ... H01M 8/0297; H01M 8/0202; C25B 9/063; C25B 15/02
See application file for complete search history.

(56) References Cited

U.S. PATENT DOCUMENTS 4,567,117 A    1/1986 Patel et al.
2004/0247991 A1*   12/2004 Suzuki ................ H01M 4/8605
                                                              429/483
(Continued)

FOREIGN PATENT DOCUMENTS

EP    2 924 793 A1    9/2015
FR    2 976 732 A1    12/2012
(Continued)

OTHER PUBLICATIONS

French Preliminary Search Report dated Aug. 3, 2016 in French Application 15 58894, filed Sep. 21, 2015 ( with English Translation of Categories of cited documents & Written Opinion ).
(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57)    ABSTRACT

A method is provided for determining a spatial distribution ($Wc_{x,y}^f$) of a parameter of interest (Wc) representative of a catalytic activity of an active layer of at least one electrode among two electrodes of an electrochemical cell, including steps of providing the cell, within which the parameter of interest (Wc) has an initial spatial distribution ($Wc_{x,y}^i$) of one or more values of catalytic load; defining a spatial distribution ($T_{x,y}^c$) of a set-point temperature ($T^c$) within the cell in operation; measuring a spatial distribution ($D_{x,y}^r$) of a first thermal quantity ($D^r$) within the cell in operation; estimating a spatial distribution ($Wc_{x,y}^e$) of a second thermal quantity ($Q^e$) within the cell in operation, depending on the spatial distribution ($T_{x,y}^c$) and on the measured spatial distribution ($D_{x,y}^r$); and determining the spatial distribution ($Wc_{x,y}^f$) of the parameter of interest (Wc) depending on the
(Continued)

estimated spatial distribution ($Q_{x,y}^e$) of the second thermal quantity ($Q^e$).

13 Claims, 6 Drawing Sheets

(51) Int. Cl.
| | | |
|---|---|---|
| H01M 4/86 | (2006.01) | |
| H01M 8/04298 | (2016.01) | |
| H01M 8/04701 | (2016.01) | |
| H01M 4/88 | (2006.01) | |
| H01M 8/0438 | (2016.01) | |
| H01M 8/04992 | (2016.01) | |
| C25B 11/02 | (2006.01) | |
| C25B 15/02 | (2006.01) | |
| C25B 1/04 | (2006.01) | |
| H01M 8/1018 | (2016.01) | |

(52) U.S. Cl.
CPC ........... *H01M 4/86* (2013.01); *H01M 4/8636* (2013.01); *H01M 4/8835* (2013.01); *H01M 8/04305* (2013.01); *H01M 8/04358* (2013.01); *H01M 8/04417* (2013.01); *H01M 8/04731* (2013.01); *H01M 8/04992* (2013.01); *C25B 1/04* (2013.01); *H01M 2008/1095* (2013.01)

(56) References Cited

U.S. PATENT DOCUMENTS

| | | |
|---|---|---|
| 2005/0095485 A1 | 5/2005 | Saulsbury et al. |
| 2007/0292737 A1 | 12/2007 | Makita et al. |
| 2007/0298299 A1 | 12/2007 | Izawa et al. |
| 2008/0020261 A1 | 1/2008 | Hendricks et al. |
| 2009/0024373 A1 | 1/2009 | Berning et al. |
| 2009/0317686 A1 | 12/2009 | Huston et al. |
| 2010/0297526 A1 | 11/2010 | Hendricks et al. |
| 2010/0323279 A1 | 12/2010 | Fujiuchi et al. |
| 2013/0034801 A1 | 2/2013 | Pavlik et al. |
| 2014/0370416 A1 | 12/2014 | Alhazmi et al. |

FOREIGN PATENT DOCUMENTS

| | | |
|---|---|---|
| FR | 2 985 610 A1 | 7/2013 |
| JP | 2000-90950 A | 3/2000 |
| JP | 2000-321353 A | 11/2000 |
| JP | 2005-293902 | 10/2005 |
| JP | 2007-323852 | 12/2007 |
| WO | WO 2007/032903 A2 | 3/2007 |
| WO | WO 2012/085245 A1 | 6/2012 |
| WO | WO 2013/088122 A1 | 6/2013 |
| WO | WO 2015/029983 A1 | 3/2015 |

OTHER PUBLICATIONS

French Preliminary Search Report dated Jun. 16, 2016 in French Application 15 58898, filed Sep. 21, 2015 (with English Translation of Categories of cited documents & Written Opinion).

French Preliminary Search Report dated May 12, 2016 in French Application 15 58896, filed Sep. 21, 2015 (with English Translation of Categories of cited documents & Written Opinion).

French Preliminary Search Report dated Aug. 3, 2016 in French Application 15 58895, filed Sep. 21, 2015 (with English Translation of Categories of cited documents & Written Opinion).

Christophe Robin et al. "Development and Experimental validation of a PEM fuel cell 2D- model to study heterogeneities effects along large-area cell surface", International Journal of Hydrogen Energy 40, 2015, 20 pages.

Lara Jabbour et al. "Feasibility of in-plane GDL structuration: Impact on current density distribution in large-area Proton Exchange Membrane Fuel Cells", Journal of Power Sources 299, 2015 11 pages.

Stefan A. Freunberger et al. "Measuring the Current Distribution in PEFCs with Sub-Millimeter Resolution", Journal of the Electrochemical Society 153, 2006, 8 pages.

Sylvie Escribano et al. "Characterization of PEMFCs gas diffusion layers properties", Journal of Power sources 156, 2006, 6 pages.

Vahid Norouzifard et al. "Deformation of PEM fuel cell gas diffusion layers under compressive loading: An analytical approach", Journal of Power sources 264, 2014, 8 pages.

Ahmad El-Kharouf et al "Ex-situ characterization of gas diffusion layers for proton exchange membrane fuel cells", Journal of Power sources 218, 2012, 12 pages.

Eliton Fontana et al "Study of the effects of flow channel with non-uniform cross-sectional area on PEMFC species and heat transfer", International Journal of Heat and Mass Transfer 54, 11 pages.

Viral Mehta et al "Review and analysis of PEM fuel cell design and manufacturing", Journal of Power Sources 114, 2003, 22 pages.

V. Mishra et al. "Measurement and Prediction of Electrical Contact Resistance Between Gas Diffusion Layers and Bipolar Plate for Applications to PEM fuel Cells", ASME 2004 1 page.

Rajashankar Sadasivam et al. "Fully developed forced convection through trapezoidal and hexagonal ducts", International Journal of Heat and Mass Transfer 42, 1999, 11 pages.

Ha Na Yu et al. Composite endplates with pre-curvature for PEMFC (polymer electrolyte membrane fuel cell), Composite Structures 92, 2010, 6 pages.

Curtis Marr et al. "Composition and Performance modelling of catalyst layer in a proton exchange membrane fuel cell", Journal of Power Sources 77, 1999, 11 pages.

David. P. Wilkinson et al. "In-plane gradients in fuel cell structure and conditions for high performance", Journal of Power sources 113, 2003, 8 pages.

Christophe Robin et al"Developpement d'un modele predictif de duree de vie d'une pile PEMFC pour une application aeronautique:etude des interactions entre le Coeur de pile et les conditions d'operation du systeme", XP055271391, 2015, 3 pages.

Ying Shi et al, "A fractal permeability model for the gas diffusion layer of PEM fuel cells", Journal of Power Sources 160, 2006, 7 pages.

Dahua Shou et al "Effective Permeability of gas diffusion layer in proton exchange membrane fuel cells", International Journal of Hydrogen Energy 38, 2013, 8 pages.

Clemens Fink et al "Three-Dimensional simulation of polymer electrolyte membrane fuel cells with experimental validation" Electrochimica Acta 56, 2011, 12 pages.

Allen Hermann et al "Bipolar plates for PEM fuel cells: A review", International Journal of Hydrogen Energy 30, 2005, 6 pages.

Gen Inoue et al "Numerical Analysis of relative humidity distribution in polymer electrolyte fuel cell stack including cooling water", Journal of Power Sources 162, 2006, 13 pages.

Pharoah, J.G., et al., "On the Temperature Distribution in Polymer Electrolyte Fuel Cells"; Journal of Power Sources, vol. 195, 2010, pp. 5235-5245.

Office Action dated Oct. 18, 2018 in co-pending U.S. Appl. No. 15/271,669.

* cited by examiner

DETERMINATION OF A SPATIAL DISTRIBUTION OF THE CATALYTIC ACTIVITY OF AN ELECTROCHEMICAL-CELL ELECTRODE

CROSS-REFERENCE TO RELATED APPLICATION

The present application is based on and claims the benefit of priority to French Application No. 15-58898, which was filed on Sep. 21, 2015, the entire contents of which is incorporated herein by reference.

TECHNICAL FIELD

The field of the invention is that of electrochemical reactors including a stack of electrochemical cells, such as fuel cells and electrolyzers, and more precisely that of methods for determining a parameter representative of the catalytic activity of at least one electrode of the electrochemical cell, and that of methods for producing an electrochemical-cell electrode.

STATE OF THE PRIOR ART

An electrochemical reactor such as a fuel cell or electrolyzer conventionally includes a stack of electrochemical cells that each comprise an anode and a cathode that are electrically separated from each other by an electrolyte, an electrochemical reaction taking place in each cell between two reactants that are continuously fed thereto. In the case of a hydrogen fuel cell, the fuel (hydrogen) is brought into contact with the anode, whereas the oxidant (oxygen), which is for example contained in air, is brought into contact with the cathode. The electrochemical reaction is subdivided into two half reactions, an oxidation reaction and a reduction reaction, which take place at the anode/electrolyte interface and at the cathode/electrolyte interface, respectively. To take place, the electrochemical reaction requires the presence of an ionic conductor between the two electrodes, namely the electrolyte, which is optionally contained in a polymer membrane, and an electronic conductor formed by the external electric circuit. The stack of cells is thus the site of the electrochemical reaction: the reactants must be supplied thereto and the products and any unreactive species must be removed therefrom, as must the heat produced during the reaction.

The cells are conventionally separated from one another by bipolar plates that ensure the electrical interconnection of the cells. The plates include a circuit for distributing fuel, formed on an anodic side, and a circuit for distributing oxidant, formed on a cathodic side opposite the anodic side. Each distributing circuit often takes the form of a network of channels for example arranged in parallel or in a serpentine arrangement, said channels being suitable for bringing the reactive species uniformly to the corresponding electrode. The bipolar plates may also include a cooling circuit formed from a network of internal ducts that allow a heat-transfer fluid to flow and thus the heat produced locally during the reaction in the cell to be removed.

Each electrode is conventionally formed from an active layer and a diffusion layer. The diffusion layer is located between the active layer and the corresponding bipolar plate. It is produced from a porous material allowing gaseous reactive species to diffuse as far as the active layer and products generated by the electrochemical reaction to diffuse out. The active layer, which is located between the electrolytic membrane and the diffusion layer, is the site of the electrochemical reaction. It generally includes an electronic conductor (for example carbon), a protonic conductor (the electrolyte) and a catalyst, for example platinum particles. It may be formed from a mixture of platinum-coated carbon powder, of PTFE particles and of polymer electrolyte (for example Nafion), said mixture being placed on a carbon fabric.

The active layer is characterized by a catalytic activity that represents the capacity of the catalyst to catalyze a reaction (here the reduction of oxygen). It may be expressed in terms of specific activity and activity per unit weight of catalyst, which correspond to the current density exchanged by the cell in operation normalized by the active surface area of the catalyst and by the weight of the catalyst, respectively. Catalytic activity especially depends on the active surface area of the catalyst and its load (also referred to as loading or content).

Conventionally, it is sought to preserve the lifetime of electrochemical cells, for example by increasing the uniformity of the spatial distribution of the current density produced by the cell in operation. Specifically, spatial nonuniformities in current density lead to spatial nonuniformities in the temperature of the cell, which may lead, on the one hand, to an increase in the rate of the degradation reactions of the various components of the cell, and on the other hand, to the generation of mechanical stresses of thermal origin that are liable to decrease the mechanical strength of the components of the cell.

Thus, document FR2976732 describes an electrochemical cell produced so as to obtain uniform local heating within the cell in operation. This heating depends on the electrical current density at each point of the cell, which is itself dependent on the partial pressure of the reactive species. Specifically, considering here the cathodic side of the cell, the amount of oxygen contained in the gas flowing through the distributing circuit gradually decreases as the oxygen is consumed by the cell, thereby leading to a spatial variation in the electrical current density produced by the cell, and therefore to a spatial variation in the heating of the cell. To prevent this spatial nonuniformity in the heating of the cell, the electrical conductivity between the bipolar plate delivering the oxygen and the cell is adjusted locally so as to compensate for the decrease in oxygen partial pressure.

In document WO2007/032903, the lifetime of an electrochemical cell is preserved by using an active layer the spatial distribution of the catalytic activity of which allows a uniform spatial distribution of current density to be obtained, which, in return, results in a uniform spatial distribution of the temperature of the cell in operation. In particular, this document describes a spatial distribution of catalytic activity that varies between the inlet and outlet of the circuits for distributing reactive species.

DISCLOSURE OF THE INVENTION

The objective of the invention is to remedy at least some of the drawbacks of the prior art, and more particularly to provide a method for determining the spatial distribution of a parameter representative of the catalytic activity of an electrochemical-cell electrode especially allowing, in particular, the uniformity of the local temperature of the electrochemical cell in operation to be increased and thus the lifetime of the latter to be preserved.

For this purpose, the invention provides a method for determining a spatial distribution of a parameter of interest representative of a catalytic activity of an active layer of at least one electrode of an electrochemical cell, said cell including two electrodes separated from each other by an electrolyte and placed between two bipolar plates suitable for bringing reactive species to the electrodes and for removing the heat produced by the cell in operation, at least one electrode including an active layer containing at least one catalyst, the active layer being suitable for generating an electrochemical reaction from one of the reactive species, said method comprising the following steps:

i) providing an electrochemical cell, within which the parameter of interest is distributed with an initial spatial distribution and for which the spatial distribution of a temperature within the electrochemical cell in operation has at least one local value higher than or equal to a preset maximum local value;

ii) defining a spatial distribution of a set-point temperature within the cell in operation, said distribution being such that the local temperature values are lower than preset maximum local values;

iii) measuring a spatial distribution of a first thermal quantity representative of the removal of heat within said electrochemical cell in operation;

iv) estimating a spatial distribution of a second thermal quantity representative of the local production of heat within said electrochemical cell in operation, depending on said spatial distribution of the set-point temperature and on said measured spatial distribution of the first thermal quantity, so that the spatial distribution of temperature of said electrochemical cell in operation, the first thermal quantity of which cell having said measured spatial distribution and the second thermal quantity of which cell having said estimated spatial distribution, is substantially equal to that of the set-point temperature; and v) determining a spatial distribution of the parameter of interest depending on the estimated spatial distribution of the second thermal quantity.

Preferably, the parameter of interest is the load of catalyst in the active layer.

Preferably, the spatial distribution of the parameter of interest is determined so that it has an average value substantially identical to an average value of the initial distribution.

Thus, a spatial distribution of the parameter of interest is obtained and taking into account this spatial distribution in the considered electrochemical cell makes it possible to ensure that the latter has, in operation, a spatial distribution of temperature corresponding substantially to that of the set-point temperature. Thus, in operation the electrochemical cell then does not present zones in which the temperature is locally above preset maximum local values.

The supply of the electrochemical cell may include a phase of experimentally prototyping or numerically modelling an electrochemical cell, a phase of measuring the spatial distribution of the temperature within the electrochemical cell in operation, then a phase of comparing the measured spatial distribution of the temperature to a preset spatial distribution of a maximum temperature. The local values of this spatial distribution of maximum temperature are the what are called preset maximum local values. When at least one local value of the measured temperature is higher than or equal to a corresponding preset maximum local value, i.e. at one and the same position within the spatial distribution, the electrochemical cell is then supplied, i.e. considered, for the following steps of the determining method.

The set-point temperature may be defined so that the local temperature values are below the corresponding maximum local values. The set-point temperature may comprise substantially constant local values, or even a substantially constant local temperature gradient. It may have local values that are not constant within the spatial distribution but that remain below these preset maximum values. It may also comprise a local gradient that is not constant within the spatial distribution but that remains below the preset maximum values.

The measurement of the spatial distribution of the first thermal quantity may be an experimental measurement carried out on the considered electrochemical cell, which will have been manufactured beforehand, or a numerical measurement carried out on a numerical model of the considered electrochemical cell. The first thermal quantity may be the local flow rate of heat-transfer fluid flowing through a cooling circuit of a bipolar plate.

The estimation of the spatial distribution of the second thermal quantity may include:

a phase of generating a mesh, for example a two-dimensional or three-dimensional mesh, of a cooling circuit of at least one bipolar plate of the electrochemical cell, through which circuit a heat-transfer fluid is intended to flow; and a phase of simulating numerically by computer the second thermal quantity on said mesh, by solving a discrete numerical model expressing the second thermal quantity as a function of the local temperature and of the first thermal quantity.

In this case, the numerical model takes into account the spatial distribution of the set-point temperature and the spatial distribution measured beforehand of the first thermal quantity. The discrete numerical model, which is what is called an electrochemical model, may be a relationship expressing a parameter representative of the local production of heat, for example the local heat flux, as a function of local temperature and of a parameter representative of the local removal of heat, for example the local flow rate of the heat-transfer fluid.

Thus, the electrochemical cell, the spatial distribution of the parameter of interest of which was obtained by the determining method, has in operation a spatial distribution of temperature substantially equal to that of the set-point temperature.

Thus, the generation of unwanted new hotspots or new temperature nonuniformities that could have appeared if the spatial distribution of the parameter of interest were determined using an essentially thermal approach, i.e. an approach based on a comparison of the actual temperature of hotspots or nonuniformities and the set-point temperature, is avoided.

Preferably, the bipolar plates are formed from two sheets that are bonded to each other, each sheet including embossments forming, in what is called an external face, a circuit for distributing a reactive specie, the embossments of the sheets together forming, in what are called internal faces that are opposite the external faces, a cooling circuit including cooling channels that communicate fluidically with one another between an inlet and an outlet of the cooling circuit. The external faces of the sheets are oriented toward an electrochemical-cell electrode. The cooling channels communicate fluidically with one another in the sense that, between the inlet and the outlet of the cooling circuit, they form a two-dimensional fluidic network, i.e. a non-linear network.

Preferably, the step of determining the spatial distribution of the parameter of interest is carried out also depending on a preset value of a parameter representative of the overall electrical power of the electrochemical cell. This parameter may be the overall electrical power, namely the product of the voltage and current density measured across the terminals of the cell, or even the efficiency thereof, for example the voltage of the cell for a given current density. It is then possible both to manage the local temperature within the electrochemical cell, with the aim of optimizing the lifetime thereof, and to maintain a wanted electrical power.

Preferably, the first thermal quantity is an effective local temperature measured within the cell in operation, and the second thermal quantity is a quantity representative of a local difference between the effective temperature and the set-point temperature.

Preferably, step v) includes:
a sub-step of calculating a spatial distribution of a correctional coefficient from the spatial distribution of the second thermal quantity; and
a sub-step in which the spatial distribution of the parameter of interest is determined by correlating the initial spatial distribution of the parameter of interest with the spatial distribution of the correctional coefficient.

Preferably, step v) includes:
a sub-step of identifying at least one zone Zi of the cell in which the second thermal quantity has an estimated local value above a preset threshold value;
a sub-step of determining the spatial distribution of the parameter of interest, by modifying the initial spatial distribution in the identified zone Zi depending on the estimated local value of the second thermal quantity in this zone.

Preferably, the first thermal quantity is representative of the local removal of the heat produced by the cell in operation, and the second thermal quantity is representative of the local production of heat by the cell in operation.

Preferably, the first thermal quantity is the measured local flow rate of a heat-transfer fluid flowing in a cooling circuit of a bipolar plate of the cell, and the second thermal quantity is the local heat flux produced by the cell in operation.

Step v) may include:
a first sub-step of estimating a spatial distribution of the density of an electrical signal produced by the cell in operation, from said estimated spatial distribution of the produced heat flux; and
a second sub-step of determining the spatial distribution of the parameter of interest, from said spatial distribution of the density of the electrical signal.

The invention also relates to a method for producing an electrochemical-cell electrode, including steps of:
considering a reference electrochemical cell, said cell including two electrodes separated from each other by an electrolyte and placed between two bipolar plates suitable for bringing reactive species to the electrodes and for removing the heat produced by the cell in operation, at least one electrode including an active layer suitable for generating an electrochemical reaction from one of the reactive species, the active layer having a parameter of interest representative of a catalytic activity spatially distributed with an initial distribution;
determining a spatial distribution of the parameter representative of catalytic activity, using the determining method according to any one of the preceding features; and
producing said electrode, so that the parameter representative of the catalytic activity of the active layer thereof has the determined spatial distribution.

The step of producing said electrode may include depositing, in at least one zone of the active layer identified beforehand from said determined spatial distribution of the parameter representative of catalytic activity, a catalytic ink having a catalytic load lower than an average catalytic load outside of said zone.

The catalytic ink may be deposited by screen printing by means of a screen-printing screen including at least one obturated aperture intended to cover said zone of the active layer.

The invention also relates to an electrochemical-cell electrode including an active layer suitable for generating an electrochemical reaction within the cell, characterized in that it has a parameter representative of a catalytic activity of the active layer, preferably a catalytic load, that has, in at least one zone of the active layer, a local value lower than an average value outside said zone.

The invention also relates to a method for producing an electrochemical cell, the method including the following steps of:
considering a reference electrochemical cell, said cell including two electrodes separated from each other by an electrolyte and placed between two bipolar plates suitable for bringing reactive species to the electrodes and for removing the heat produced by the cell in operation, at least one electrode including an active layer suitable for generating an electrochemical reaction from one of the reactive species, the active layer having a parameter of interest representative of a catalytic activity spatially distributed with an initial distribution;
determining a spatial distribution of the parameter of interest, using the determining method according to any one of the preceding features; and
producing the electrochemical cell, on the basis of the reference electrochemical cell in which the parameter of interest has the determined spatial distribution.

By "on the basis of", what is meant is that the produced electrochemical cell has the same electrochemical properties as those of the reference cell, with the exception of the parameter of interest, which is distributed with the determined spatial distribution. The produced electrochemical cell may be the reference cell in which the initial spatial distribution of the parameter of interest has been modified to be substantially equal to the determined spatial distribution.

The invention also relates to a storage medium containing instructions for implementing the determining method according to any one of the preceding features, these instructions being executable by a processor.

BRIEF DESCRIPTION OF THE DRAWINGS

Other aspects, aims, advantages and characteristics of the invention will become more clearly apparent on reading the following detailed description of preferred embodiments thereof, which description is given by way of nonlimiting example and with reference to the appended drawings, in which.

DETAILED DESCRIPTION OF PARTICULAR EMBODIMENTS

In the figures and in the rest of the description, references that are the same represent identical or similar components. In addition, the various components are not shown to scale so as to make the figures clearer. Moreover, the various embodiments and variants are not mutually exclusive and can be combined with one another. Unless indicated otherwise, the terms "substantially", "about" and "of the order of" mean to within 10%.

The various embodiments and variants will be described with reference to a fuel cell and in particular to a PEM (proton exchange membrane) hydrogen fuel cell the cathode of which is supplied with oxygen and the anode of which with hydrogen. However, the invention is applicable to any type of fuel cell, and in particular to those operating at low temperatures, i.e. temperatures below 200° C., and to electrochemical electrolyzers.

Figure 1A:
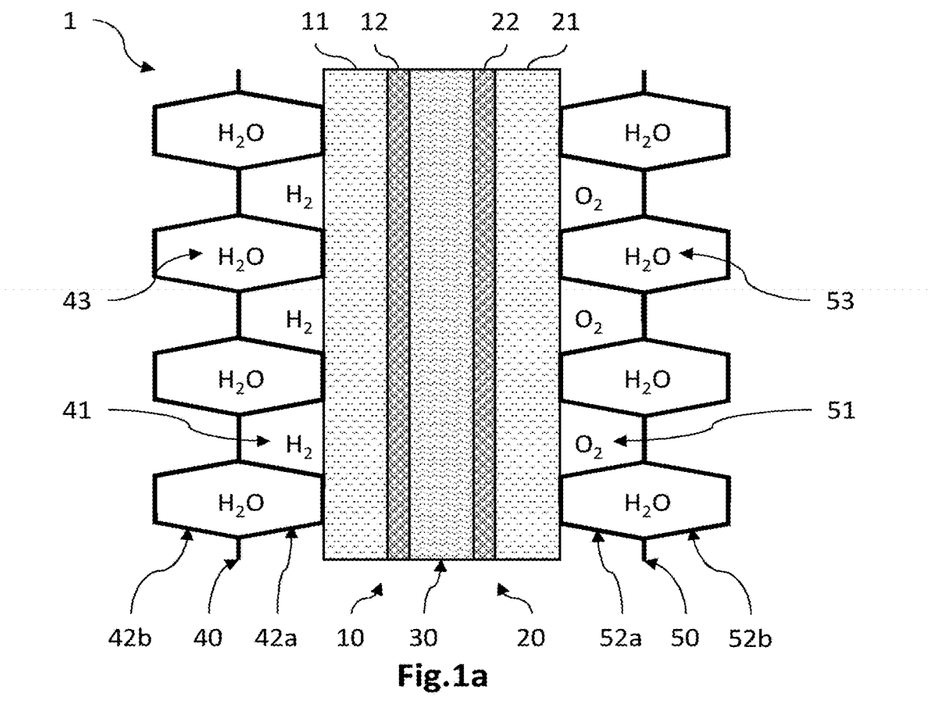
FIG. 1a is a schematic cross-sectional representation of an exemplary electrochemical cell.

FIG. 1a partially and schematically illustrates an exemplary electrochemical cell 1 belonging to a stack of cells of a PEM fuel cell. The cell 1 includes an anode 10 and a cathode 20 that are separated from each other by an electrolyte here comprising a polymer membrane 30, the electrodes 10, 20 being placed between two bipolar plates 40, 50 that are suitable for bringing reactive species to the electrodes and for removing the heat produced by the electrochemical reaction.

The bipolar plates include a circuit 41 for distributing hydrogen, which circuit is located on an anodic side, and a circuit 51 for distributing oxygen, which circuit is located on a cathodic side. They are here formed from two metal sheets 42a, 42b; 52a, 52b, that are joined to one another by welded zones or spot welds and pressed so as to form the distributing circuits. The arrangement of the embossments also allows a cooling circuit 43, 53 to be produced inside the plates, through which a heat-transfer fluid may flow without making contact with the electrodes. Other bipolar-plate technologies may be used, for example the plates may be produced from a filled composite, for example a composite filled with graphite, the embossments of which are produced by molding.

Each electrode 10, 20 includes a gas diffusion layer (GDL) 11, 21 placed in contact with one of the bipolar plates 40, 50 and an active layer 12, 22 located between the membrane 30 and the diffusion layer 11, 21. The diffusion layers 11, 21 are made from a porous material that permits the diffusion of the reactive species from the distributing circuit of the bipolar plates to the active layers, and the diffusion of the products generated by the electrochemical reaction to the same distributing circuit. The active layers 12, 22 are the site of electrochemical reactions. They include materials suitable for allowing the oxidation and reduction reactions at the respective interfaces of the anode and cathode with the membrane. More precisely, they each include an ionomer ensuring the protonic conductivity, for example Nafion, a catalyst for generating the electrochemical reaction, for example platinum, and an electrically conductive carrier, for example a carbon-containing matrix.

As mentioned above, the catalytic activity of the active layer especially depends on the active surface area of the catalyst, i.e. the surface area of the catalyst capable of making contact with the reactive species, expressed in square centimeters or sometimes in square centimeters per unit weight of catalyst, and the load (or loading or content) of catalyst, expressed in grams per unit area of the cell.

Figure 1B:
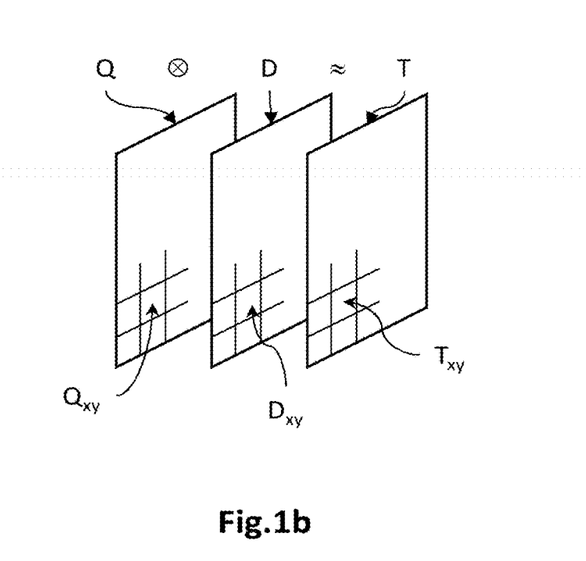
FIG. 1b is a schematic representation illustrating the correlational relationship between the spatial distribution of heat production and the spatial distribution of heat removal the result of which is the temperature spatial distribution of the temperature of the electrochemical cell in operation.

FIG. 1b schematically shows the spatial distribution of the temperature T of the electrochemical cell as the resultant of a correlational relationship between the spatial distribution of a heat production source term, in other words a quantity representative of the production of heat by the cell, such as the produced heat flux Q, and the spatial distribution of a quantity representative of the removal of the heat produced, for example the mass flow rate D of the heat-transfer fluid in the cooling circuit.

Thus, contrary to the teaching of the prior-art document cited above, it is not enough to increase the uniformity of the distribution of production of heat Q and therefore of the distribution of the heating of the cell to make the distribution of the effective temperature T of the cell uniform. Specifically, it is important to take into account both the possible presence of local nonuniformities in the heat-production term Q and the possible presence of local nonuniformities in the heat-removal term D.

The local production of heat, or more precisely the local produced heat flux Q, is directly proportional to the local electrical power production, or more precisely to the local current density I, as expressed by the relationship between their respective spatial distributions:

$$Q_{x,y} = I_{x,y}(\Delta H/2F - U_{x,y}) \qquad (2)$$

where $\Delta H$ is the enthalpy of the electrochemical reaction, F is Faraday's constant, and $U_{x,y}$ is the spatial distribution of the local voltage of the cell, the enthalpy and voltage possibly being considered to be almost uniform at every point of the cell. Thus, the production of heat is impacted by any nonuniformity due to fluidic parameters (dimensions of the circuits for distributing reactive species, etc.), electrochemical parameters (local properties of the electrodes and of the membrane, etc.), but also electrical parameters (electrical resistances of the various components of the cell, the resistivities of the materials for example and the contact resistances between the components of the cell, etc.), which parameters all influence the current-density distribution.

The removal of heat via the flow of the heat-transfer fluid may also exhibit local nonuniformities especially due to minor head losses in the cooling circuit. These head losses are a result of the dimensions of the cooling circuit as produced during the production of the bipolar plates, and may lead to the formation of zones of high flow rate or low flow rate within the cooling circuit.

In the context of the invention, it is sought to adapt the spatial distribution of a parameter of interest influencing the production of electrical power, and therefore of thermal energy, so that the spatial distribution of the effective temperature of the cell in operation corresponds to that of a set-point temperature, while taking into account the spatial distribution of the effective heat removal that the electrochemical cell exhibits.

The parameter influencing the production of electrical power is here a parameter representative of the catalytic activity of the active layer of at least one electrode of the electrochemical cell. The value of this parameter of interest influences current density $I_{x,y}$ locally insofar as it determines the number of electrons that recombine or protons that are generated at the cathode and anode, respectively, during the electrochemical redox reactions. The parameter of interest is here the load of catalyst Wc or catalytic load. It may also be a question of any equivalent parameter, such as the active surface area of the catalyst. It will be understood here that the lower the local catalyst load $Wc_{x,y}$, the lower the local current density $I_{x,y}$ produced by the cell (and therefore the lower the local flux $Q_{x,y}$ of produced heat) will be.

By temperature of the cell, what is meant is local temperature, i.e. the spatial distribution of the temperature of any one of the components of the cell, for example one of the bipolar plates or even one of the electrodes. The temperature of the cell may thus correspond to the spatial distribution of the temperature of the heat-transfer fluid in the cooling circuit. The effective temperature of the cell is the spatial distribution of temperature when the cell is operating at the polarization point defined by the voltage of the cell $U_{tot}$ and the total current density $I_{tot}$, i.e. the local current density $I_{x,y}$ integrated over the entire area of the cell.

By parameter representative of heat removal, what is meant is a parameter the value of which represents the capacity of the cell to remove locally produced heat. It may in particular be a question of the local mass or volume flow rate of the heat-transfer fluid flowing in the cooling circuit.

By spatial distribution of a parameter, what is meant is the local value of this parameter at every point in the cell, or more precisely, at every point (x,y) in a plane parallel to the cell in the what is called active zone corresponding to the areal extent of the active layers of the electrodes.

Thus, an electrochemical cell the catalytic load of which is spatially distributed with the distribution thus determined will have an effective temperature, or temperature during operation of the cell, substantially equal to the set-point temperature. This set-point temperature advantageously has a spatial distribution that is substantially uniform scalarwise or gradientwise. By uniform scalarwise, what is meant is that the local value of the temperature is substantially constant. By uniform gradientwise, what is meant is that the local temperature gradient is substantially constant. The local temperature values may however not be constant while remaining below preset maximum local values. The cell then does not contain zones of excess temperature, or hotspots, that on the one hand may increase the rate of the degradation reactions of the components of the cell, and on the other hand may generate mechanical stresses liable to degrade the mechanical strength of the components of the cell. The lifetime of the electrochemical cell is then preserved. By hotspot, what is for example meant is a zone of the cell that contains a temperature peak or a temperature-gradient peak. More precisely, a hotspot may be a zone where the difference between the local temperature and the inlet temperature of the cooling circuit is larger than the product of a coefficient and the temperature difference between the inlet and outlet of the cooling circuit, the coefficient possibly being about 1.2 to 3 or more, and preferably being about 1.5. By way of example, for a temperature of 77° C. at the inlet of the cooling circuit and of 80° C. at the outlet of the circuit, and for a coefficient equal to 1.5, a hotspot is a zone of the cell in which the local temperature exceeds 81.5° C.

Figure 2:
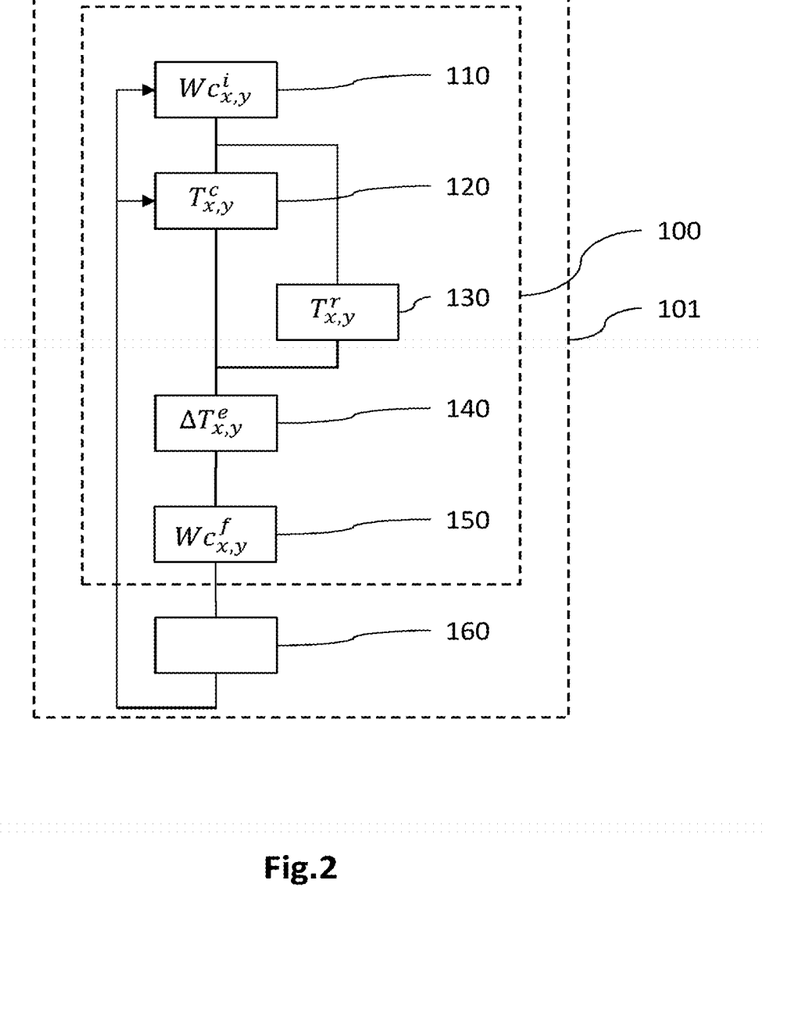
FIG. 2 a is a flowchart of a method for determining the spatial distribution of the catalytic load of an electrochemical cell according to a first embodiment.

FIG. 2 a is a flowchart of a method for determining the spatial distribution of the parameter of interest representative of the catalytic activity of an electrode, according to a first embodiment. In this example, the parameter of interest is the catalyst load Wc of an active layer of an electrode of the cell, for example the cathodic active layer, the value $Wc_{x,y}$ of which has a direct influence on the local electrical current density $I_{x,y}$ produced locally by the electrochemical reaction and therefore on the local heat flux $Q_{x,y}$ produced.

Generally, according to this first embodiment, an optimized spatial distribution $Wc_{x,y}^{f}$ of the load of catalyst Wc is determined from the estimation of the spatial distribution $\Delta T_{x,y}^{e}$ of a difference $\Delta T^{e}$ between an effective temperature $T^{r}$ of the cell in operation—in which cell the catalytic load is spatially distributed with a given initial distribution—and a preset set-point temperature $T^{c}$. It is then possible to modify locally the catalytic load Wc of the active layer so that it has the optimized distribution $Wc_{x,y}^{f}$, so that the effective temperature $T^{r}$ of the modified cell is substantially equal to the set-point temperature $T^{c}$.

In a first step 110, a reference electrochemical cell is defined within which the catalytic load Wc of the cathodic active layer is spatially distributed with an initial distribution $Wc_{x,y}^{i}$. The cell has a structure identical or similar to that described with reference to FIG. 1. The initial spatial distribution $Wc_{x,y}^{i}$ of the catalytic load Wc may be substantially uniform, i.e. here it has a value that is substantially constant at every point in the active zone.

In a step 120, a spatial distribution $T_{x,y}^{c}$ of a set-point temperature $T^{c}$ of the reference cell when the latter is in operation and producing a total current density $I_{tot}$ for a given voltage $U_{tot}$ is defined. To the first order, the set-point temperature $T^{c}$ of the cell may correspond to a temperature of the heat-transfer fluid in the cooling circuit, the distribution of this temperature then especially depending on its values at the inlet $T_{e}^{c}$ and outlet $T_{s}^{c}$ of the cooling circuit. By way of illustration, the inlet temperature may be set beforehand, for example to 75° C., and the outlet temperature may be estimated from the thermal power $P_{th}$ to be removed, the latter corresponding to the electrical power $P_{e}=I_{tot} \cdot U_{tot}$ delivered during operation of the cell. The thermal power $P_{th}$ is estimated by integrating over the active zone the local produced heat flux $Q_{x,y}$ obtained from relationship (2). The outlet temperature $T_{s}^{e}$ is then estimated by correlating the thermal power $P_{th}$ estimated beforehand with the average total flow rate $<D_{tot}>$ of the heat-transfer fluid in the cooling circuit, by means of the heat capacity $c_{p}$ of the heat-transfer fluid. It is then possible to define the spatial distribution $T_{x,y}^{c}$ of the set-point temperature $T^{c}$ from the values of the temperature of the heat-transfer fluid at the inlet $T_{s}^{c}$ and outlet $T_{s}^{c}$ of the cooling circuit, the distribution $T_{x,y}^{c}$ advantageously being uniform gradientwise, i.e. the local set-point temperature gradient is substantially constant.

In a step 130, a spatial distribution $T_{x,y}^{r}$ of a first thermal quantity representative of the temperature of the cell in operation is obtained. The first thermal quantity is here the effective temperature $T^{r}$ of the electrochemical cell when it is operating under the same operating conditions as those considered in step 120. This distribution $T_{x,y}^{r}$ is not estimated but is the result of a measurement by experimental or numerical means. It may thus be obtained by experimental measurement of an electrochemical cell having the same properties as the reference cell defined in step 110, for example by means of a S++ board sold by "S++ Simulation Services", including an invasive plate inserted between two bipolar plates and suitable for measuring a spatial distribution of temperature. The distribution $T_{x,y}^r$ of effective temperature may also be obtained by numerical simulation from an electrochemical cell model, for example that described in the publication by Inoue et al., *Numerical analysis of relative humidity distribution in polymer electrolyte fuel cell stack including cooling water*, J. Power Sources 162 (2006) 81-93.

The distribution $T_{x,y}^r$ of the effective temperature $T^r$ obtained by experimental or numerical measurement thus takes into account local nonuniformities in the produced heat flux, which depends on local current density, and local nonuniformities in heat removal, which especially depends on the local flow rate of the heat-transfer fluid in the cooling circuit.

In a step 140, the spatial distribution of a second thermal quantity is estimated, here a quantity $\Delta T^e$ representative of a local difference between the effective temperature $T^r$ and the set-point temperature $T^c$. This quantity of local difference $\Delta T^e$ is estimated from the spatial distribution $T_{x,y}^c$ of the set-point temperature $T^c$ defined in step 120 and from the spatial distribution $T_{x,y}^r$ of the effective temperature $T^r$ measured in step 130. It may be a question of the difference between the local value of the effective temperature and that of the set-point temperature, or of a ratio of these values, inter alia. Here, the term-to-term difference between the distributions of the effective temperature and set-point temperature are considered: $\Delta T_{x,y}^e = T_{x,y}^r - T_{x,y}^c$.

Next, in a step 150, the spatial distribution $Wc_{x,y}^f$ of the catalytic load Wc is determined depending on the spatial distribution $\Delta T_{x,y}^e$ of the local difference $\Delta T^e$.

According to a first variant, a correctional coefficient is firstly calculated, the spatial distribution of which is proportional term-to-term to that $\Delta T_{x,y}^e$ of the local difference $\Delta T^e$. By way of example, the correctional coefficient varies continuously between a minimum value and a maximum value, as the local difference varies between a substantially zero value and a maximum value, respectively. The minimum value of the correctional coefficient may here be substantially comprised between 0 and 0.75, or even between 0 and 0.5, and for example be substantially equal to 0, 0.1, 0.2 or 0.3, and the maximum value may be substantially equal to unity. Next, the spatial distribution $Wc_{x,y}^f$ of the catalytic load Wc may be determined by correlation, for example by a term-to-term multiplication, of the initial spatial distribution $Wc_{x,y}^i$ of the catalytic load Wc with the spatial distribution of the correctional coefficient. Thus, in the zones of the cell where the difference $\Delta T^e$ between the effective temperature and the set-point temperature has a maximum value, i.e. in the zones called hotspots, the initial local value $Wc_{x,y}^i$ of the catalytic load Wc is multiplied by the local value of the correctional coefficient, which is for example equal to 0.25 or even less. Thus, the catalytic load Wc has a new local value that is decreased with respect to the initial local value, which decreases the local current density and therefore the produced heat flux.

According to a second variant, firstly at least one zone $Z_i$ of the cell in which the difference $\Delta T^e$ has a value above a preset threshold value is identified, the threshold value for example being representative of a hotspot. Next, the spatial distribution $Wc_{x,y}^f$ of the catalytic load Wc is determined by modifying the initial spatial distribution $Wc_{x,y}^i$ in the identified zone $Z_i$ depending on the local value of the difference $\Delta T^e$ in this zone. By way of example, the initial spatial distribution $Wc_{x,y}^i$ may be modified locally using a correctional coefficient the value of which is proportional to that of the difference $\Delta T^e$ in this zone. As in the first variant, the correctional coefficient varies continuously between a minimum value and a maximum value, for example between 0 and 1.

Thus, a spatial distribution $Wc_{x,y}^f$ of the catalytic load Wc of the active layer is obtained. It is then possible to modify the initial distribution Wc of the catalytic load Wc of the cathodic active layer of the reference cell so that it is the same as the new distribution determined in step 150. The cell thus optimized then has, in operation, an effective temperature the spatial distribution of which is substantially equal to that of the set-point temperature. Insofar as the distribution of the set-point temperature is advantageously uniform, the cell in operation has an effective temperature the distribution of which is also substantially uniform, thus allowing the lifetime of the cell to be preserved.

FIG. 3*a* is a flowchart of a method for determining the spatial distribution of a parameter of interest representative of the catalytic activity of an active layer of at least one electrode of an electrochemical cell, according to a second embodiment. In this example, the parameter of interest is the catalytic load Wc of the active layer, here the cathode, the value of which has a direct influence on the electrical current density exchanged locally during the electrochemical reaction.

Generally, according to this second embodiment, the spatial distribution $Wc_{x,y}^f$ of the catalytic load Wc is determined from the estimation of the spatial distribution of the production of heat necessary to obtain the spatial distribution of a set-point temperature, while taking into account the spatial distribution of a thermal quantity representative of the effective heat removal in the cell. It is then possible to modify the initial distribution of the catalytic load Wc of the active layer so that it has an optimized spatial distribution, so that the effective temperature is then substantially equal to the set-point temperature. The electrochemical cell, the parameter of interest of which is spatially distributed with the optimized distribution, has in operation a temperature substantially equal to the set-point temperature. Unwanted new hotspots or new temperature nonuniformities are not formed.

This approach, which is what may be referred to as an electrochemical and no longer essentially thermal approach, is particularly advantageous when at least one bipolar plate, or even both bipolar plates, of the electrochemical cell are formed from sheets that are bonded to one another and that contain embossments that define a two-dimensional cooling circuit. The embossments of each sheet, in the faces referred to as the external faces of the sheets, i.e. the faces oriented toward an electrode, define a circuit for distributing reactive species. In the internal faces, i.e. the faces opposite the external faces, the embossments form a cooling circuit through which a heat-transfer fluid is intended to flow. The cooling circuit is what is called linear when the cooling channels do not communicate with one another, i.e. when the heat-transfer fluid, between the inlet and outlet of the cooling circuit, cannot substantially pass from one cooling channel to another. The cooling circuit is what is called two-dimensional when the cooling channels communicate with one another, so as to form a two-dimensional fluidic network that is non-linear. This is especially the case when the distributing channels of a sheet are not parallel to those of the other sheet.

In a first step 210, a reference electrochemical cell is defined, or supplied, within which the catalytic load Wc of the cathodic active layer is spatially distributed with an initial distribution $Wc_{x,y}^i$. The initial spatial distribution $Wc_{x,y}^i$ of the catalytic load Wc may be substantially uniform scalarwise, so that its local value is substantially constant at every point in the active zone. The cell has a structure that is identical or similar to that described with reference to FIG. 1 and this step is similar or identical to the step 110 described above. The considered electrochemical cell then has, in operation, a spatial distribution of temperature at least one local value of which is higher than or equal to a preset maximum local value. The latter may be constant or differ depending on the considered point of the electrochemical cell. This step may include:

- a phase of experimentally prototyping or numerically modelling an electrochemical cell;
- a phase of measuring the spatial distribution of the temperature within the electrochemical cell in operation; then
- a phase of comparing the measured spatial distribution of the temperature to a preset spatial distribution of a maximum temperature. The local values of this spatial distribution of maximum temperature are the what are called preset maximum local values.

When at least one local value of the measured temperature is higher than or equal to a corresponding preset maximum local value, i.e. at the same position within the spatial distribution, the electrochemical cell is then supplied, i.e. considered, for the following steps of the determining method.

In a step 220, a spatial distribution $T_{x,y}^c$ of a set-point temperature $T^c$ of the reference cell when the latter is in operation and producing a total current density $I_{tot}$ for a given voltage $U_{tot}$ is defined. This step is similar or identical to the step 120 described above. The local values of the spatial distribution of the set-point temperature are lower than corresponding maximum local values.

Optionally, it is advantageous to specify the spatial distribution $T_{x,y}^c$ of the set-point temperature $T^c$ as a function of the spatial distribution of the concentration of reactive species in the active zone between the inlet and outlet of the corresponding distributing circuit. Specifically, the consumption of reactive species within the active zone of the cell leads to a gradual decrease in the concentration of reactive species along the distributing circuit. This gradual decrease results in a decrease in the local current density produced by the cell and therefore in the local production of heat, thereby leading to the formation of nonuniformities in the temperature of the cell. To compensate for this gradual decrease in the production of heat, it is advantageous to define a set-point temperature that takes into account the decrease in the concentration of reactive specie, so that the effective temperature of the cell in operation corresponds to the set-point temperature, the latter advantageously having a uniform spatial distribution. To do this, the spatial distribution $\tilde{T}_{x,y}^c$ of the specified set-point temperature $\tilde{T}^c$ may for example be written:

$$\tilde{T}_{x,y}^c = T_{x,y}^c + K^i \cdot [\max(c_{x,y}^i) - c_{x,y}^i] \quad (3)$$

where $c_{x,y}^i$ is the spatial distribution of the concentration $c^i$ in reactive species i, for example in oxygen, and $K_i$ is a positive constant, for example close to 1, which may be subsequently adjusted. The spatial distribution $c_{x,y}^i$ of the concentration $c^i$ may be estimated to the first order from the routing of the channels of the distributing circuit of the reactive species in question and by assuming a uniform consumption throughout the active zone. It may also be more accurately determined by numerical or experimental measurement of the spatial distribution of the current density in a cell that is similar or identical to the reference cell, which allows the spatial distribution of the concentration of the reactive species to be deduced. Other relationships (3) may be used to specify the spatial distribution of the set-point temperature while taking into account the spatial variation in the concentration of reactive species. Thus, a spatial distribution $\tilde{T}_{x,y}^c$ of the set-point temperature $\tilde{T}^c$ is obtained that thus allows a distribution of the effective temperature of the cell to be obtained the uniformity of which is improved.

Moreover, optionally and possibly complementarily with the step of specifying the set-point temperature described above, it is advantageous to specify the spatial distribution $T_{x,y}^c$ of the set-point temperature $T^c$ as a function of the spatial distribution $\varphi_{x,y}$ of the relative humidity $\varphi$ in the distributing circuits. The relative humidity $\varphi$ is defined conventionally as the ratio of the partial pressure $P_{H2O}$ of the water vapor contained locally in the gas flowing through the distributing circuit to the saturated vapor pressure $P_{sat}$. The relative humidity $\varphi$ has an effect on the rate of the electrochemical reactions. Thus, to compensate for the local variation in relative humidity, it is advantageous to define a set-point temperature that compensates for this local variation, for example for local humidification and dehumidification in the distributing circuits, so that the effective temperature of the cell in operation has a uniform spatial distribution. To do this, the spatial distribution $\tilde{T}'^c_{x,y}$ of the specified set-point temperature $\tilde{T}'^c$ may for example be written:

$$\tilde{T}'^c_{x,y} = T_{x,y}^c + K^{\varphi} \cdot [\varphi_{x,y}/\varphi_{in}] \quad (4)$$

where $\varphi_{x,y}$ is the spatial distribution of the relative humidity $\varphi$ in the distributing circuit, $\varphi_{in}$ is the relative humidity at the inlet of the distributing circuit, and $K^{\varphi}$ is a positive constant, for example close to 1, which may be subsequently adjusted. The distribution $\varphi_{x,y}$ of the total-water relative humidity $\varphi$ may be estimated to the first order from the routing of the channels of the distributing circuit in question and by assuming a uniform current density throughout the active zone. It may also be more accurately determined by numerical or experimental measurement of the spatial distribution of the current density in a cell that is similar or identical to the reference cell, which allows the spatial distribution of the relative humidity to be deduced. Other relationships (4) may be used to specify the spatial distribution of the set-point temperature from the spatial variation in relative humidity. Thus, a spatial distribution $\tilde{T}_{x,y}^c$ of the set-point temperature $\tilde{T}^c$ is obtained that thus allows a distribution of the effective temperature of the cell to be obtained the uniformity of which is improved.

In a step 230, a spatial distribution $D_{x,y}^r$ of a first thermal quantity representative of the local removal of heat $D^r$ within the electrochemical cell in operation is obtained. The first thermal quantity is here the mass flow rate $D^r$ of heat-transfer fluid in the cooling circuit. This distribution $D_{x,y}^r$ is not estimated but is the result of a measurement by experimental or numerical means. It may thus be obtained by experimental measurement of an electrochemical cell having the same properties as the reference cell defined in step 210, for example by means of a particle image velocimetry (PIV) technique or any other suitable technique, carried out on a cooling circuit having the same dimensional characteristics as that of the reference cell. The distribution $D_{x,y}^r$ of the mass flow rate $D^r$ may also be obtained by numerical simulation using a flow simulation software package such as FLUENT or COMSOL for example.

In a step 240, the spatial distribution $Q_{x,y}^e$ of a second thermal quantity $Q^e$ is estimated from said spatial distribution $T_{x,y}^c$ of the set-point temperature $T^c$ defined in step 220 and from said spatial distribution $D_{x,y}^r$ of the heat-transfer fluid flow rate $D^r$ obtained in step 230. The second thermal quantity is representative of the local production of heat and here corresponds to the local heat flux $Q^e$ that the heat-transfer fluid $D^r$ removes to obtain the set-point temperature $T^c$.

Figure 4:
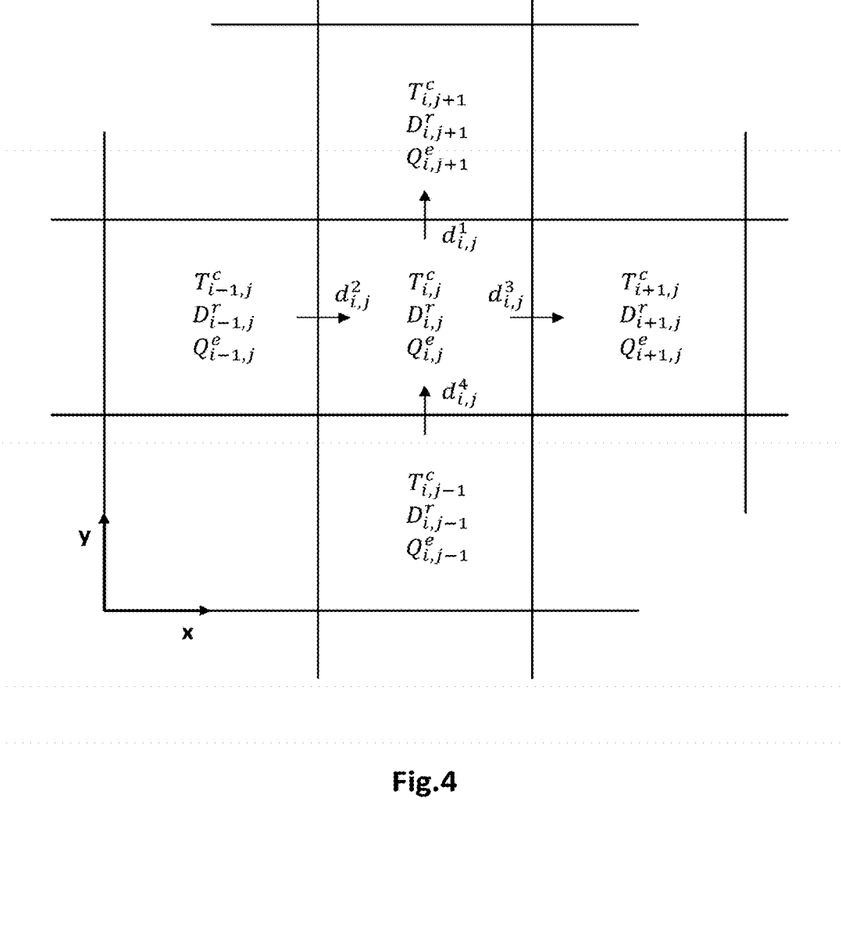
FIG. 4 is an example of a mesh of the cooling circuit, in which each mesh cell includes a local heat production term $Q_{i,j}^e$, a local heat removal term $D_{i,j}^r$, and a local temperature $T_{i,j}^c$.

To do this, as illustrated in FIG. 4, the cooling circuit is discretized into a two-dimensional or three-dimensional, here two-dimensional, mesh, each mesh cell of which is an elementary volume (i,j) passed through by the heat-transfer fluid. Thus, each mesh cell (i,j) of the distributing circuit has two known quantities: the local set-point temperature $T_{i,j}^c$ and the local flow rate $D_{i,j}^r$ of the heat-transfer fluid; and a quantity to be determined: the local produced heat flux $Q_{i,j}^e$. Next, the amount of heat and fluid transferred between the mesh cell in question and the adjacent mesh cells is calculated by determining, on the one hand, the temperature differences and, on the other hand, the flow rates of the heat-transfer fluid at the four facets of the mesh cell in question. This calculation may be carried out by numerical simulation by computer, on said mesh. This amounts to solving a discrete numerical model expressing the second thermal quantity, namely here the local heat flux, as a function of the local temperature and of the first thermal quantity, namely here the local flow rate of the heat-transfer fluid. The numerical model, which is what is referred to as an electrochemical model, may be expressed by relationship (7).

The temperature differences at the four facets of the mesh cell (i,j) may be calculated in the following way:

$$\delta T_{i,j}^1 = T_{i,j}^c - T_{i,j+1}^c \tag{5-1}$$

$$\delta T_{i,j}^2 = T_{i,j}^c - T_{i-1,j}^c \tag{5-2}$$

$$\delta T_{i,j}^3 = T_{i,j}^c - T_{i+1,j}^c \tag{5-3}$$

$$\delta T_{i,j}^4 = T_{i,j}^c - T_{i,j-1}^c \tag{5-4}$$

The flow rates of the heat-transfer fluid at the four facets of the mesh cell (i,j) may be obtained by projecting the mass flow rate $D_{i,j}^r$ (here a vectorial datum) onto the vectors $e_x$ and $e_y$ passing through the mesh cells (i−1,j), (i,j) and (i+1,j), and through the mesh cells (i,j−1), (i,j) and (i,j+1), respectively:

$$d_{i,j}^1 = (D_{i,j}^r \cdot e_y + D_{i,j+1}^r \cdot e_y)/2 \tag{6-1}$$

$$d_{i,j}^2 = (D_{i,j}^r \cdot e_x + D_{i-1,j}^r \cdot e_x)/2 \tag{6-2}$$

$$d_{i,j}^3 = (D_{i,j}^r \cdot e_x + D_{i+1,j}^r \cdot e_x)/2 \tag{6-3}$$

$$d_{i,j}^4 = (D_{i,j}^r \cdot e_y + D_{i,j-1}^r \cdot e_y)/2 \tag{6-4}$$

By convention, the local flow rate $d_{i,j}$ is considered to be positive when the fluid enters into the mesh cell (i,j) and negative when the fluid exits therefrom.

Lastly, the spatial distribution $Q_{x,y}^e$ of the heat flux $Q^e$ produced by the cell is calculated from the relationship:

$$Q_{x,y}^e \approx Q_{i,j}^e = \Sigma_{k=1}^4 d_{i,j}^k \cdot c_p \cdot \delta T_{i,j}^k \tag{7}$$

Thus, the spatial distribution of the heat flux $Q^e$ that the cell must produce for the effective temperature distribution to correspond to that of the set-point temperature is obtained, the distribution of the effective mass flow rate of the heat-transfer fluid in the distributing circuit being known.

In a step 250, the spatial distribution $Wc_{x,y}^f$ of the catalytic load Wc is determined depending on the spatial distribution $Q_{x,y}^e$ of the produced heat flux $Q^e$. To do this, it is possible to firstly estimate the spatial distribution of the density of an electrical signal produced by the cell in operation, for example a current density $I^e$, from the estimated spatial distribution $Q_{x,y}^e$ of the produced heat flux $Q^e$. Insofar as the produced heat flux $Q^e$ is approximately proportional to the current density $I^e$, the latter may be determined from the relationship:

$$I_{x,y}^e = Q_{x,y}^e \cdot \frac{I_{tot}}{Q_{tot}} \tag{8}$$

where $I_{tot}$ is the total current density delivered by the electrochemical cell in operation, and $Q_{tot}$ is the total produced heat flux, which is obtained by integrating the spatial distribution $Q_{x,y}^e$ over all the active area.

Next, the new spatial distribution $Wc_{x,y}^f$ of the catalytic load Wc is determined from the local density of the electrical current $I_{x,y}^e$. To do this, one approach consists in determining the minimum $Wc_{min}$ and maximum $Wc_{max}$ values of the load Wc of the active layer. It may be a question of values commonly used in the context of PEM cell stacks. Next, the spatial distribution $Wc_{x,y}^f$ is calculated, for example using the relationship:

$$Wc_{x,y}^f = \max\left(Wc_{max}, Wc_{min} \frac{I_{max}^e}{I_{x,y}^e}\right) \tag{9}$$

where $I_{max}^e$ is the maximum value of the local current density $I_{x,y}^e$. The local load Wc thus varies linearly between the minimum $Wc_{min}$ and maximum $Wc_{max}$ values as a function of the local value of the current density $I^e$. Of course, any other law, for example a polynomial, exponential or logarithmic law, causing the local load Wc to vary so that the maximum value $Wc_{max}$ corresponds to a maximum local current density and vice versa, may be used. The minimum $Wc_{min}$ and maximum $Wc_{max}$ values may be preset depending on the overall electrical power UI wanted for the electrochemical cell, where U is the electrical voltage and I the electrical current density measured across the terminals of the cell.

Figure 5:
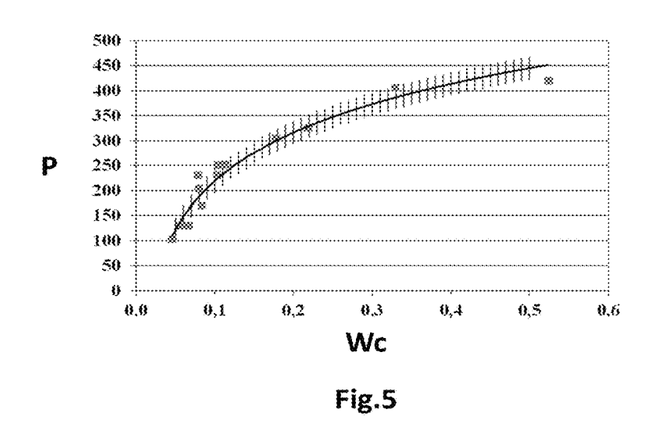
FIG. 5 is an example of a relationship between the power density of a fuel cell as a function of the catalytic load of the electrochemical cells.

Alternatively to relationship (9), the spatial distribution $Wc_{x,y}^f$ is determined from a curve giving the relationship between the current density I and the load Wc. FIG. 5 is an example of such a relationship, which here equivalently relates the power density of a fuel cell in operation to the catalytic platinum load of the electrochemical cells, for an efficiency of 50%. The spatial distribution $Wc_{x,y}^f$ is determined depending on the spatial distribution $I_{x,y}^e$. It will be noted here that the catalytic load may vary from a minimum value of about 0.05 mg/cm² to a maximum value of about 0.4 mg/cm² to 0.5 mg/cm², this leading current density to increase and therefore power to increase from 100 mW/cm² to 400 mW/cm².

Thus, a spatial distribution $Wc_{x,y}^f$ of the load Wc taking into account the distribution of production of electrical power $I^e$ and therefore of thermal energy $Q^e$, and which ensures the effective temperature of the cell in operation corresponds to the set-point temperature $T^c$, has been determined, while also taking into account the effective removal $D^r$ of heat by the cooling circuit. Insofar as the set-point temperature is advantageously spatially uniform, a cell at least one of the electrodes of which includes an active layer the catalytic load Wc of which is distributed with the spatial distribution $Wc_{x,y}^f$ thus determined has, when it is operating at the polarization point $U_{tot}$ and $I_{tot}$, an effective temperature the spatial distribution of which is uniform.

Figure 6A:
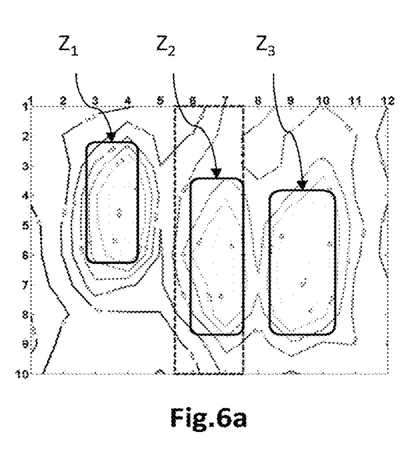
FIG. 6a is an exemplary spatial distribution of the effective temperature of a reference electrochemical cell in operation, for which cell the catalytic load of the active layers of the electrodes is spatially uniform.

FIG. 6a illustrates an exemplary spatial distribution of the effective temperature of an electrochemical cell in operation, in the case where the anodic and cathodic active layers have a substantially uniform catalytic load. Three zones of excess temperature, or hotspot zones, are present, referenced $Z_1$ to $Z_3$. The operating conditions in this case are a pressure of 1.5 bar, a temperature of 80° C. at the outlet of the cooling circuit, a relative humidity of 50% at the anode- and cathode-side inlets, and a stoichiometry of 1.8 for the air and 1.5 for the hydrogen.

Figure 6B:
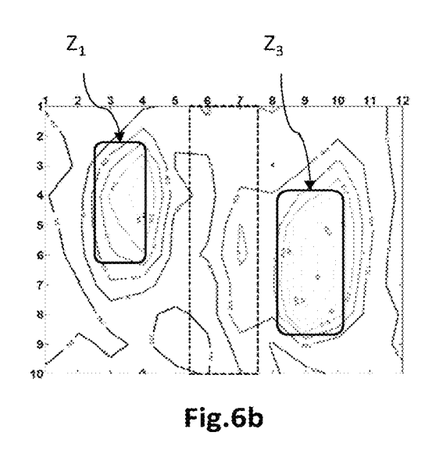
FIG. 6b is an exemplary spatial distribution of the effective temperature of an electrochemical cell for which the catalytic load of the active layers has a spatial distribution determined using the method of the first embodiment.

FIG. 6b illustrates the spatial distribution of the effective temperature of the same electrochemical cell in operation, in the case where at least one active layer has a catalytic load having the spatial distribution modified according to the first embodiment of the method (FIG. 2) only in one portion of the cell indicated by the dashed lines. It will be noted that, in this portion in which a hotspot $Z_2$ was present, the temperature distribution is substantially uniform and does not contain zones of excess temperature. In the other portions of the cell, in which the catalytic load was not modified, the hotspots $Z_1$ and $Z_3$ are still present.

Figure 3:
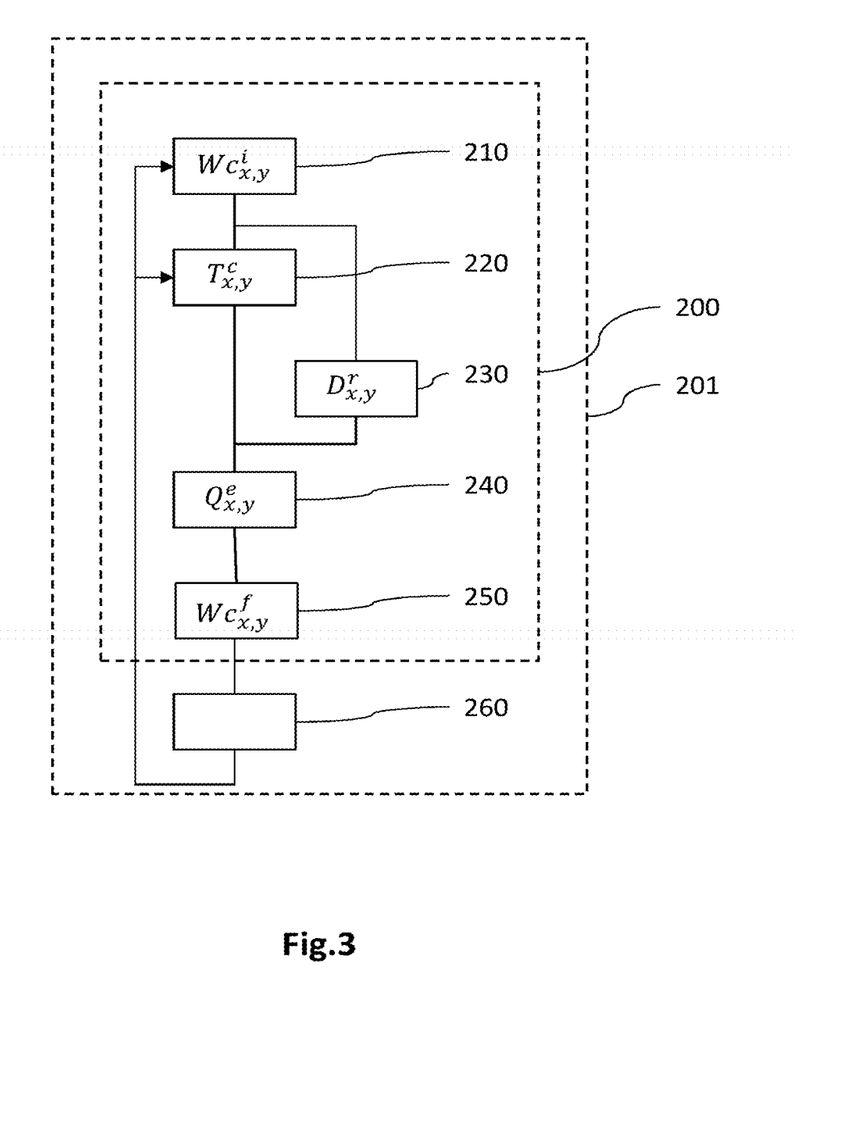
FIG. 3a is a flowchart of a method for determining the spatial distribution of the catalytic load of an electrochemical cell according to a second embodiment.

A method for producing an electrochemical-cell electrode will now be described, here the cathode of the cell. An electrochemical cell that is identical or similar to the reference cell defined in steps 110 and 210 is considered. It includes two electrodes separated from each other by an electrolyte and placed between two bipolar plates suitable for bringing reactive species to the electrodes and for removing the heat produced by the cell in operation. The electrodes each include a diffusion layer and an active layer. The cathode here has an active layer the catalytic load Wc of which is spatially distributed with an initial distribution $Wc_{x,y}^i$. Using the method described above with reference to FIG. 2 or 3, a spatial distribution $Wc_{x,y}^f$ of the catalytic load of the cathodic active layer is determined. Next, in a step 160 (FIG. 2) or 260 (FIG. 3), the cathode is produced in such a way that the catalytic load Wc of the active layer has the determined spatial distribution $Wc_{x,y}^f$.

Thus, the catalytic load Wc of the active layer is modified locally so as to form nonuniformities in the spatial distribution $Wc_{x,y}$ with a view to correcting the nonuniformities in the effective temperature of the cell in operation with respect to a set-point temperature. By way of example, the load Wc of the active layer is decreased locally in zones in which the effective temperature of the cell is liable to be above the set-point temperature. Thus, the local current density is decreased, thereby consequently decreasing the local produced heat flux. Thus, the effective temperature of the cell corresponds locally to the set-point temperature.

To achieve this, on a carrier of the active layer, for example a carbon-containing carrier, a catalytic ink including, by way of illustration, a catalyst, for example 4 g of $Pt_3Co$, an ionomer, for example 6.4 g of Nafion, water, for example in an amount of 18.5 g, and a solvent, for example 1.5 g of ethanol, is deposited.

The catalytic ink may be deposited on the surface of the carrier of the active layer of the cathode, in at least one identified zone $Z_i$ of excess temperature, or even on all the surface of the active layer, by any deposition technique known to those skilled in the art, screen printing for example.

Figure 7A:
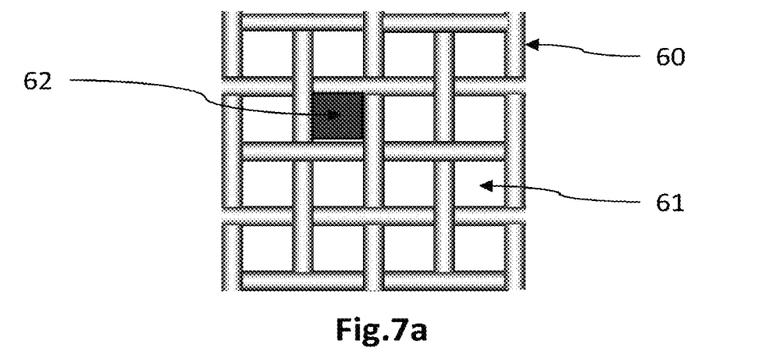
FIGS. 7a to 7c illustrate three steps of the deposition of a catalytic ink on the surface of an electrochemical-cell active layer by means of a screen-printing screen.
Figure 7B:
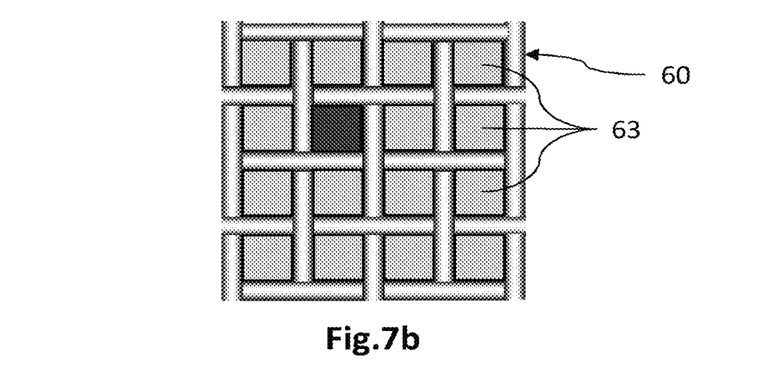
Figure 7C:
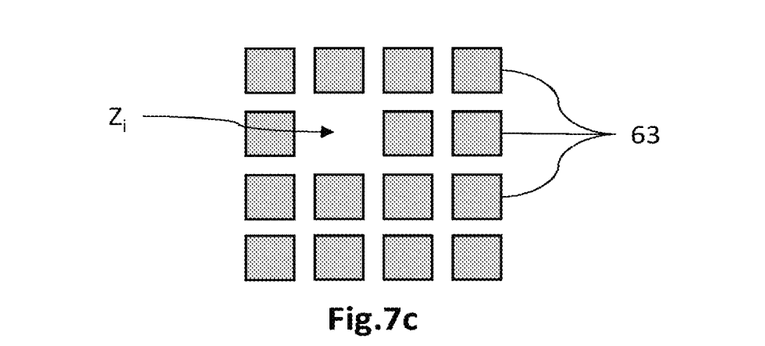

With reference to FIGS. 7a to 7c, in the case where a deposit is produced by screen printing in certain zones of the active layer, a screen-printing screen 60 is produced that forms a mesh of through-apertures 61, for example of a few square centimeters in an area. Certain apertures 62 are obturated to prevent the deposition of catalytic ink in the identified zones $Z_i$ (FIG. 7a). Next, the screen 60 is placed on the carrier of the active layer then the catalytic ink 63 is deposited on the active layer through the screen 60 (FIG. 7b). After the screen has been removed, the active layer includes the catalytic ink 63 on substantially all its surface except for the zones $Z_i$ (FIG. 7c). The amount of catalyst may be adjusted in the zones $Z_i$ by optionally carrying out one or more successive depositions in these zones with a catalytic ink containing a different amount of catalyst from that used in the zones adjacent the zones $Z_i$.

Thus, the active layer has a catalytic load the value of which varies locally. In at least one zone $Z_i$, the local value of the catalytic load is lower than the average value of the load outside this zone $Z_i$.

By way of illustration, the zones $Z_i$ in which the catalytic load Wc is modified according to the spatial distribution $Wc_{x,y}^f$ determined using the determining method described with reference to FIG. 2 or 3 may have an area of about a few hundred square microns to a few square centimeters, for example an area from 400 µm², which is the typical size of a mesh cell of a screen-printing screen of the type conventionally used, to 110 cm², which is half the total area of a cell of 220 cm². Of course, these data are here purely illustrative. More precisely, such a zone $Z_i$ has an area ranging from 0.5 cm² to 40 cm², where 0.5 cm² is here the minimum typical size of a mesh cell of a measuring device allowing temperature nonuniformities to be measured, and where 40 cm² is the typical size of the measured hotspots. The area of the zones $Z_i$ may thus be about 6 cm².

It has been observed that decreasing the amount of catalyst by 100% in a 2×16 cm² strip allows the local current density to be decreased by 0.3 A/cm², this leading to a decrease in the effective local temperature of 2° C. on average. Thus, by extrapolation, it may be assumed that a decrease of 0.1 mg/cm² in the amount of platinum in an area of at least 1 cm² will cause a decrease in the effective temperature in this zone of 0.5° C.

The catalytic load may be comprised between 0 and 0.5 mg/cm² in the case of platinum for an electrochemical cell for a fuel cell. The catalytic load has a maximum local value outside of the zones $Z_i$, and a local value in the zones $Z_i$ lower than the nominal value. The nominal average value of the load is comprised between the maximum and minimum local values and corresponds to the average of the local load over the entire area of the active layer. The nominal average value especially depends on the desired total power density. It may thus be about 0.4 mg/cm² of platinum. The content of ionomer, for example of Nafion, may be comprised between 2% and 30% of the catalytic load, may preferably be comprised between 7% and 20% and may for example be about 15%.

It may be advantageous for the determined spatial distribution $Wc_{x,y}^f$ of the load Wc to have a nominal average value substantially identical to that of the initial distribution $Wc_{x,y}^i$, so as not to modify the total power density of the cell in operation. Thus, whereas in the hotspot zones $Z_i$ the spatial distribution $Wc_{x,y}^f$ has a local value below that of the initial distribution $Wc_{x,y}^i$, the local value $Wc_{x,y}^f$ is increased outside of the zones $Z_i$. By way of example, to retain an average value of 0.4 mg/cm² of platinum over all of the active layer, a decrease of 0.1 mg/cm² in a zone $Z_i$ of 6 cm² area leads to 0.6 mg being distributed over the rest of the area of the active layer, for example over 214 cm² for a cell with an active layer with an area of 220 cm².

Particular embodiments have just been described. Alternative variants and various modifications will be apparent to the person skilled in the art.

The invention claimed is:

1. A method for determining a spatial distribution ($Wc_{x,y}^f$) of a parameter of interest (Wc) representative of a catalytic activity of an active layer of at least one electrode among two electrodes of an electrochemical cell, said electrochemical cell including the two electrodes separated from each other by an electrolyte and placed between two bipolar plates, said electrochemical cell being configured to supply reactive species to the two electrodes and to remove heat produced by the electrochemical cell in operation, the active layer of the at least one electrode containing at least one catalyst, the active layer being configured to generate an electrochemical reaction from the reactive species, said method comprising:
   i) providing the electrochemical cell, within which the parameter of interest (Wc) has an initial spatial distribution ($Wc_{x,y}^i$) of one or more values of catalytic load, and within which a spatial distribution of a temperature within the electrochemical cell in operation has at least one local temperature value that is greater than or equal to a preset maximum temperature local value;
   ii) defining a spatial distribution ($T_{x,y}^c$) of a set-point temperature ($T^c$) within said electrochemical cell in operation, said spatial distribution ($T_{x,y}^c$) being such that local temperature values are lower than preset maximum local temperature values;
   iii) measuring a spatial distribution ($D_{x,y}^r$) of a first thermal quantity ($D^r$) representative of local removal of heat within said electrochemical cell in operation;
   iv) estimating a spatial distribution ($Q_{x,y}^e$) of a second thermal quantity ($Q^e$) representative of local production of heat within said electrochemical cell in operation, depending on said spatial distribution ($T_{x,y}^c$) of the set-point temperature ($T^c$) within the electrochemical cell in operation and on said measured spatial distribution ($D_{x,y}^r$) of the first thermal quantity ($D^r$), so that the spatial distribution of the temperature of said electrochemical cell in operation, the first thermal quantity ($D^r$) of the electrochemical cell having said measured spatial distribution ($D_{x,y}^r$), and the second thermal quantity ($Q^e$) of the electrochemical cell having said estimated spatial distribution ($Q_{x,y}^e$), is substantially equal to said spatial distribution ($T_{x,y}^c$) of the set-point temperature ($T^c$) within the electrochemical cell in operation; and
   v) determining the spatial distribution ($Wc_{x,y}^f$) of the parameter of interest (Wc) depending on the estimated spatial distribution ($Q_{x,y}^e$) of the second thermal quantity ($Q^e$).

2. The method according to claim 1, wherein the parameter of interest (Wc) is a load of catalyst in the active layer.

3. The method according to claim 1, wherein the spatial distribution ($Wc_{x,y}^f$) of the parameter of interest (Wc) is determined so that the spatial distribution ($Wc_{x,y}^f$) has an average value substantially identical to an average value of the initial distribution ($Wc_{x,y}^i$).

4. The method according to claim 1, wherein the bipolar plates are formed from two sheets that are bonded to each other, each sheet of said two sheets including embossments having an external face defining a circuit configured to distribute the reactive species, the embossments of the sheets together having internal faces, which are opposite the external faces, defining a cooling circuit including cooling channels in fluid communication with one another between an inlet and an outlet of the cooling circuit.

5. The method according to claim 1, wherein the step v) of determining the spatial distribution ($Wc_{x,y}^f$) of the parameter of interest (Wc) further depends on a preset value of a parameter representative of an overall electrical power of the electrochemical cell.

6. The method according to claim 1, wherein the step iv) of estimating the spatial distribution ($Q_{x,y}^e$) of the second thermal quantity ($Q^e$) includes:
   generating a mesh of a cooling circuit of at least one bipolar plate of the two bipolar plates, the cooling circuit being configured to permit flow of a heat-transfer fluid; and
   determining the second thermal quantity ($Q^e$) on said mesh, by solving a discrete numerical model expressing the second thermal quantity ($Q^e$) as a function of the at least one local temperature and of the first thermal quantity ($D^r$).

7. The method according to claim 1, wherein the first thermal quantity ($D^r$) is the measured local flow rate of heat-transfer fluid flowing in the cooling circuit of at least one bipolar plate of the two bipolar plates, and the second thermal quantity ($Q^e$) is local heat flux produced by the electrochemical cell in operation.

8. The method according to claim 7, wherein the step v) of determining the spatial distribution ($Wc_{x,y}^f$) of the parameter of interest (Wc) further includes:
   a) estimating a spatial distribution ($I^e$) of the density of an electrical signal produced by the electrochemical cell in operation, from said estimated spatial distribution ($Q_{x,y}^e$) of the local heat flux; and
   b) determining the spatial distribution ($Wc_{x,y}^f$) of the parameter of interest (Wc), from said spatial distribution ($I^e$) of the density of the electrical signal.

9. A method for producing an electrochemical-cell electrode, comprising:
   based on a reference electrochemical cell including two electrodes separated from each other by an electrolyte and placed between two bipolar plates configured to supply reactive species to the two electrodes and to remove heat produced by the electrochemical cell in operation, at least one electrode of the two electrodes including an active layer configured to generate an electrochemical reaction from the reactive species, the active layer having a parameter of interest representative of a catalytic activity (Wc) spatially distributed with an initial spatial distribution ($Wc_{x,y}^i$),
   i) determining a spatial distribution ($Wc_{x,y}^f$) of the parameter of interest representative of catalytic activity (Wc), using the method according to claim 1; and
   ii) producing said electrochemical-cell electrode so that the parameter of interest representative of the catalytic activity (Wc) has the determined spatial distribution ($Wc_{x,y}^f$).

10. The method according to claim 9, wherein producing said electrochemical-cell electrode includes depositing, in at least one zone ($Z_i$) of the active layer identified from said determined spatial distribution ($Wc_{x,y}^f$) of the parameter representative of catalytic activity (Wc), a catalytic ink having a catalytic load lower than an average catalytic load outside of said zone ($Z_1$).

11. The method according to claim 10, wherein the catalytic ink is deposited by screen printing by a screen-printing screen including at least one obturated aperture configured to cover said zone ($Z_i$).

12. A method for producing an electrochemical cell, comprising:

based on a reference electrochemical cell including two electrodes separated from each other by an electrolyte and placed between two bipolar plates configured to supply reactive species to the two electrodes and to remove heat produced by the electrochemical cell in operation, at least one electrode of the two electrodes including an active layer configured to generate an electrochemical reaction from the reactive species, the active layer having a parameter of interest representative of a catalytic activity (Wc) spatially distributed with an initial spatial distribution ($Wc_{x,y}^i$), i) determining a spatial distribution ($Wc_{x,y}^f$) of the parameter of interest representative of a catalytic activity (Wc), using the method according to claim 1; and ii) producing the electrochemical cell, on the basis of the reference electrochemical cell in which the parameter of interest representative of a catalytic activity (Wc) has the determined spatial distribution ($Wc_{x,y}^f$).

13. A nontransitory data storage medium containing instructions, which when run on a processor, cause the processor to perform a method according to claim 1.

* * * * *